United States Patent
Jensen et al.

(10) Patent No.: US 9,251,507 B2
(45) Date of Patent: *Feb. 2, 2016

(54) REDUCING EMAIL MESSAGE SIZE

(75) Inventors: Peter M. Jensen, Sherwood, OR (US); Arun K. Sar, Santa Clara, CA (US); Cody J. Schaff, Durango, CO (US); Robert L. Welgan, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

This patent is subject to a terminal disclaimer.

(21) Appl. No.: 12/914,666

(22) Filed: Oct. 28, 2010

(65) Prior Publication Data

US 2012/0110090 A1    May 3, 2012

(51) Int. Cl.
  *G06F 15/16*    (2006.01)
  *G06Q 10/10*    (2012.01)
(52) U.S. Cl.
  CPC .................. *G06Q 10/107* (2013.01)
(58) Field of Classification Search
  CPC .............................. H04L 12/589; H04L 51/36
  USPC ................................................. 709/204, 206
  See application file for complete search history.

(56) References Cited

U.S. PATENT DOCUMENTS

| | | | |
|---|---|---|---|
| 6,256,672 B1 | 7/2001 | Redpath | |
| 6,628,306 B1 | 9/2003 | Marchionda | |
| 7,030,730 B1 * | 4/2006 | Zondervan | G06Q 10/107 340/7.1 |
| 7,596,285 B2 * | 9/2009 | Brown et al. | 382/299 |
| 7,730,146 B1 * | 6/2010 | Mace et al. | 709/206 |
| 2002/0013817 A1 | 1/2002 | Collins et al. | |
| 2002/0112010 A1 | 8/2002 | Soroker et al. | |
| 2004/0078437 A1 | 4/2004 | Guillemin | |
| 2007/0005713 A1 * | 1/2007 | LeVasseur et al. | 709/206 |
| 2007/0011258 A1 * | 1/2007 | Khoo | 709/206 |
| 2008/0120385 A1 | 5/2008 | Maoz | |
| 2009/0292780 A1 * | 11/2009 | Ramesh et al. | 709/206 |

OTHER PUBLICATIONS

IBM, "Method of identifying text and/or file attachments of a single e-mail document for conditional transmission to parties by recipient category ("To", "cc:", or "bcc:")", IPCOM000031379D, IP.com, Mar. 17, 2005, 3 pages.
IBM, "A Method and a System for Optimizing Delivering of E-Mail Attachments", IPCOM000102883D, IP.com, Sep. 22, 2004, 2 pages.

* cited by examiner

*Primary Examiner* — Wing F Chan
*Assistant Examiner* — Andrew Woo
(74) *Attorney, Agent, or Firm* — Walter W. Duft

(57) ABSTRACT

A method, system and computer program product for supporting email message size reduction. Example operations may include identifying a first email recipient that is to receive a full version of an email message (full email message), identifying a second email recipient representing a new class of email recipient that is to receive a summary version of the email message (summary email message), and performing an action to facilitate the full email message being sent to the first email recipient and the summary email message being automatically generated from the full email message and sent to the second email recipient. The foregoing operations may be performed in one way by an email client and in another way by an email server. The email client and the email server may share responsibility for reducing email message size. Alternatively, the email client (or another implementing entity) may act alone.

18 Claims, 9 Drawing Sheets

REDUCING EMAIL MESSAGE SIZE

BACKGROUND

1. Field

The present disclosure relates to the sending and receiving of electronic mail (email). More particularly, the disclosure is directed to the management and control of email message size.

2. Description of the Prior Art

By way of background, when email messages are used to convey information to a group of recipients, not every recipient necessary wants or needs to know the details of each message. For example, if the email recipient group is an engineering design team, the group manager(s) may request to be sent courtesy copies of email messages exchanged between rank and file design team members, but may have no intention of reading each message and its attachments. In that case, the manager may specify that the courtesy copies be marked with an appropriate identifier in the message subject line that flags the message as a courtesy copy that the recipient may read at his or her leisure. In order to automate the handling of such courtesy copy messages, the manager might define a rule in his or her email client that stores such messages in a separate folder for subsequent viewing if there is a need to consult the information.

A disadvantage of the foregoing scenario is that the courtesy copy recipient receives full email messages and attachments. This consumes network bandwidth and storage space on email servers and clients, all of which may be at premium, particular in enterprise email environments. Accordingly, applicants have identified a need for an improved technique for handing courtesy copy email messages.

SUMMARY

A method, system and computer program product for supporting email message size reduction are respectively disclosed. When an email message is generated, copied or forwarded, a full email message that comprises full email message text may be sent to one or more regular email recipients who are members of the traditional "To", "Cc" and "Bcc" recipient categories. A summary email message that comprises summary email message text in lieu of the full message text may be sent to one or more email recipients who are members of a new class of email recipient that may be denoted as the "FYI" (For Your Information) recipient category. Such recipients will not receive the full email message unless they request it. Because the size of the summary email message is less than that of the full email message, network bandwidth and storage space is conserved.

According to one example embodiment, some aspects of email message size reduction may be practiced in the context of an email client, while other aspects of email message size reduction may be practiced in the context of an email server. In another example embodiment, all aspects of email message size reduction could be practiced in the context of a single entity, such as an email client (or other system or device).

Example operations for supporting email message size reduction may include identifying a first email recipient (e.g., in the "To", "Cc" or "Bcc" recipient category) that is to receive a full version of the email message (full email message), identifying a second email recipient (e.g., in the "FYI" recipient" category) that is to receive a summary version of the email message (summary email message), and performing an action to facilitate the full email message being sent to the first email recipient and the summary email message being automatically generated from the full email message and sent to the second email recipient.

According an example implementation of the above-described operations in an email client, the first identifying operation may comprise receiving an email address of the first email recipient in a first user interface field. The second identifying operation may comprise receiving an email address of the second email recipient in a second user interface field. The facilitating action may comprise sending the full email message to an email server. The full email message may include a first email header field that contains the email address of the first email recipient, a second email header field that contains the email address of the second email recipient, and information for use by the email server to generate the summary email message.

According an example implementation of the above-described operations an email server, the first identifying operation may comprise inspecting a first email header field that contains an email address of the first email recipient. The second identifying operation may comprises inspecting a second email header field that contains an email address of the second email recipient. The facilitating action may comprise sending the full email message for delivery to the first email recipient. The facilitating action may further comprise automatically generating the summary email message using information contained in the full email message and sending the summary email message for delivery to the second email recipient. The facilitating action may further comprise storing a copy of the full email message and forwarding it to the second email recipient upon request.

In any of the foregoing embodiments, the summary email message may comprise (1) a shortened version of the email message, or (2) a comment regarding the email message, or (3) both. If the summary email message is a shortened version of the email message, the summary email message may comprise a first "n" characters of the email message, where "n" may be user-selectable.

According to a further aspect, the summary email message may contain information that allows the second email recipient to automatically request the full email message. This information may comprise a user interface object in the summary email message, such as a hyperlink containing an address from which the full email message may be retrieved. Alternatively, the information may comprise a header field in the summary email message that is useable by an email client of the second email recipient to insert a hyperlink or other user interface object in the summary email message from which the full email message may be retrieved.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

Figure 1:
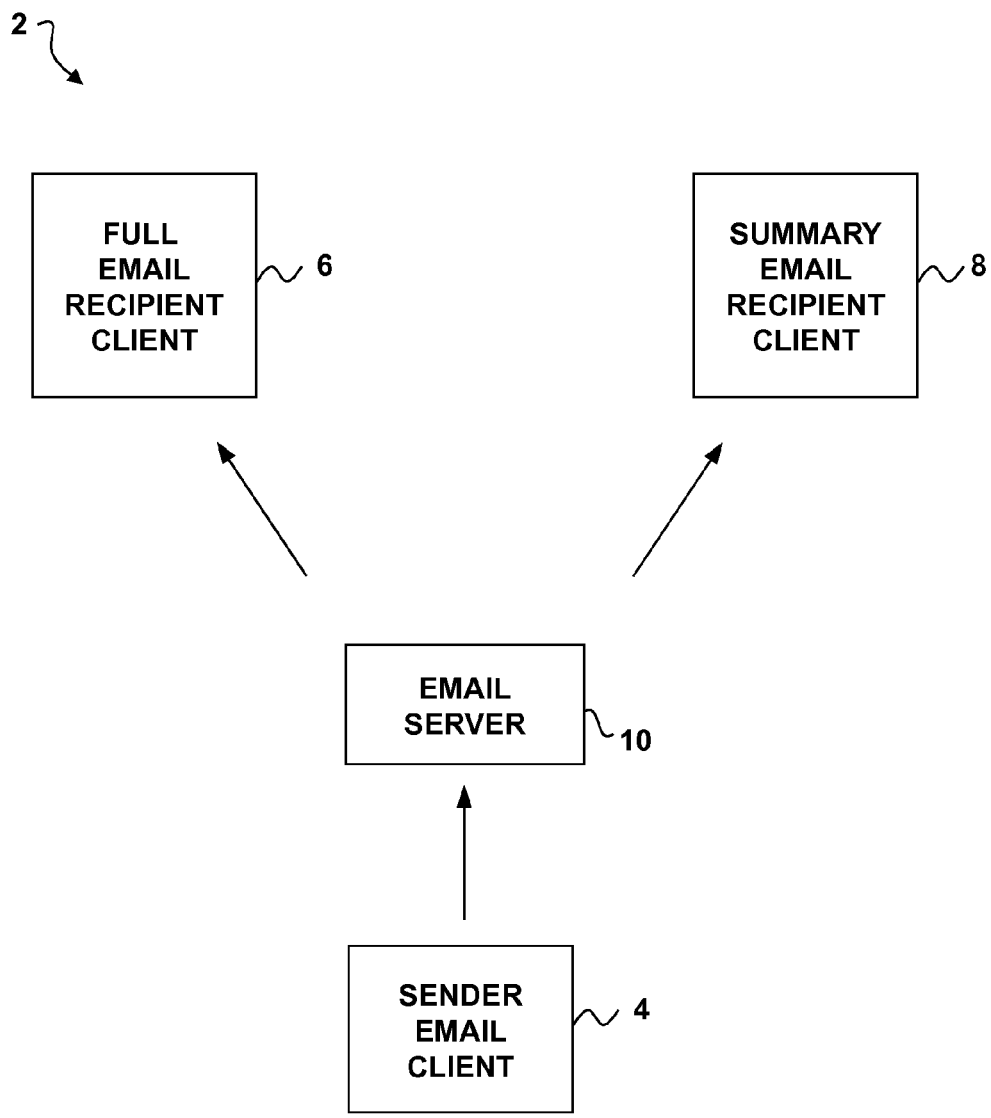
FIG. 1 is a functional block diagram showing an example email messaging environment.

Turning now to the figures, wherein like reference numerals represent like elements in all of the several views, FIG. 1 illustrates an example email messaging environment 2 in which email message size reduction may be practiced according to embodiments disclosed herein. In the email messaging environment 2, a first email client 4, a second email client 6 and a third email client 8 are operable to exchange email messages via one or more email servers, such as an email server 10. Any suitable communication infrastructure, such as a wireline or wireless network, may be used to provide the necessary communication pathways that interlink the aforementioned email client and email server entities. Examples of such communication infrastructure include, but are not limited to, private networks, public networks, virtual private networks, or combinations of the foregoing.

The email clients 4, 6 and 8 may embody any intelligent device, system or appliance of any convenient form that is capable of interacting with a user and implementing programmable (or dedicated) email client logic for sending and receiving email messages. Example implementations of the email clients 4, 6 and 8 thus might comprise an email or email/web browser program (or other logic) executed by a mainframe, midrange or workstation computer, a personal desktop computer, a laptop computer, a cellular telephone or other handheld device, a web appliance or other embedded system, a virtual machine, etc., all of which represent examples of possible email client computing systems.

Even though the email clients 4, 6 and 8 may be identically configured entities, they are designated as being either an email sender or an email recipient according to the roles they are assigned to play within the context of the present discussion. In particular, the email client 4 will be hereinafter referred to as a sender email client because it is assigned the role of sending email messages to the email clients 6 and 8. Such messages could be authored by a user of the sender email client 4, or they could be received from elsewhere and forwarded or copied by a user of the sender email client.

The email client 6 will be hereinafter referred to as a full email recipient client because it is assigned the roll of receiving full email messages. Such full email messages could be intended for a user of the full email recipient client 6 who might be a rank and file member of a design team. Other full email recipient clients could also be present in the email messaging environment 2, but are not shown for ease of illustration. Such additional clients, if present, could receive the same full email messages for viewing by users who might be additional rank and file colleagues of the same design group.

The email client 8 will be referred to hereinafter as a summary email recipient client because it is assigned the role of receiving summary email messages that are of smaller size than the full email messages. Such summary email messages could be intended for a user of the summary email recipient client 8 who might be a manager of the above-mentioned design team. Other summary email recipient clients could also be present in the email messaging environment 2, but are not shown for ease of illustration. Such additional clients, if present, could receive the same summary email messages for viewing by users who might be additional managers of the same design group.

The email server 10 is generally representative of one or more servers and may embody any intelligent device, system or appliance of any convenient form having programmable (or dedicated) email server logic for performing one or more email server functions. Example implementations of the email server 10 thus might comprise an email server program (or other logic) executed by a mainframe, midrange or workstation computer, a personal desktop computer, a laptop computer, a cellular telephone or other handheld device, a web appliance or other embedded system, a virtual machine, etc., all of which represent examples of possible email server computing systems. As depicted by the one-way arrows in FIG. 1, one of the functions of the email server 10 is to receive email message content from the sender email client 4 and to deliver email message content to the full email recipient client 6 and the summary email recipient client 8. In one example embodiment of the email messaging environment 2, the email server 10 may be an outgoing gateway email relay host (e.g. mail transfer agent) or perhaps a mailbox host for the sender email client 4. Alternatively, the email server 10 could potentially be an intermediate (non-gateway) mail transfer agent. The email server 10 could potentially also be an incoming gateway server (e.g. POP server) or perhaps a mailbox (e.g., IMAP) host for the full email recipient client 6 and/or the summary email client 8. It also will be appreciated that the sender email client 4 and the email server 10 could be disposed on separate hardware entities, or they could be integrated in a single entity, such as a system or device that runs both an email client program and an email server program. Similarly, the email server 10 could be integrated with one of the full recipient email client 6 or the summary recipient email client 8.

According to alternative embodiments to be described in more detail below, the sender email client 4 and the email server 10 may be variously configured to support, provide and/or utilize a system, method and computer program product for supporting email message size reduction. When an email message is generated, copied or forwarded, a full email message that comprises full email message text may be sent to one or more regular email recipients who are members of the traditional "To", "Cc" and "Bcc" recipient categories. A summary email message that comprises summary email message text in lieu of the full message text may be sent to one or more email recipients who are members of a new class of email recipient that may be denoted as the "FYI" (For Your Information) recipient category. Such recipients will not receive the full email message unless they request it. Because the size of the summary email message is less than that of the full email message, network bandwidth and storage space is conserved.

In a first example embodiment, the sender email client 4 and the email server 10 share responsibility for reducing email message size. In a second example embodiment, the sender email client 4 acts alone. Although not shown, other embodiments could potentially be implemented wherein the email size reduction operations described herein are not necessarily performed by an email client or an email server per se. As such, it does not particularly matter what name or identifier is given to the functional entities that are involved in performing the relevant operations.

First Example Embodiment

According to a first example embodiment, the sender email client 4 and the email server 10 share responsibility for reducing email message size. In this embodiment, the sender email client 4 sends a full email message to the email server 10, together with information that allows the email server to generate a summary version of the email message and forward both email message versions to the appropriate recipients. Example operations that may be performed by the sender email client 4 are represented by the sender email client program logic 12 in FIG. 2. FIG. 3 depicts an example email message composition display window 14 that may be generated by the sender email client 4. Example operations that may be performed by the email server 10 are represented by the email server program logic 16 in FIG. 4. These drawing figures are discussed in detail below.

Example Email Client Operations

As shown in block 12-2 of FIG. 2, the sender email client program logic 12 (hereinafter referred to as client program logic) may generate an email addressing user interface 18 within the email message composition display window 14 shown in FIG. 3. The client program logic 12 could do this in response to a first user input for originating a new email message or in response to a second user input for forwarding or copying an existing email message. The email addressing interface 18 is similar to a conventional email addressing interface insofar as it includes as set of standard first user interface fields 20-1, 20-2 and 20-3 for sending a normal (full version) email message (which may include attachments). The first user interface fields 20-1, 20-2 and 20-3 respectively correspond to the standard "To", "Cc" and Bcc" recipient categories. These fields are provided for entering the email addresses of one or more email recipients who are to receive full email messages, such as a user of the full email recipient client 6 of FIG. 1. Although not shown in FIG. 3, each of the first user interface fields 20-1, 20-2 and 20-3 may be duplicated in order to add additional recipients for a particular category. As is conventional, such duplication may be performed using a suitable user input action, such as typing an "Enter" keystroke after entering a first email address in order to enter a next email address for the same recipient category.

Unlike conventional email client addressing interfaces, the email addressing interface 18 further includes a special second user interface field 22. The second user interface field 22 is for sending a summary version of an email message. By way of example only, the second user interface field 22 may be labeled as an "FYI" field, which signifies "For Your Information." It will be appreciated that any other suitable designation could also be used. The second user interface field 22 is provided for entering the email address of one or more email recipients who represent a new class of email recipient that are to receive summary email messages, such as a user of the summary email recipient client 8 of FIG. 1. Although not shown in FIG. 3, the second user interface field 22 may also be capable of duplication using a suitable user input action, such as typing an "Enter" keystroke after entering an email address. In this way, multiple FYI recipients may be specified.

The email addressing interface 18 may further include a conventional third user interface field 24, which may be labeled "Subject:", for entering an email message subject description. Below the email addressing interface 18, the client program logic 12 generates an email message body interface 26 that contains the message text representing the body of the email message. The sample email message text shown therein is for purposes of illustration only.

Returning now to FIG. 2, in block 12-4 the client program logic 12 identifies a first email recipient (the full email recipient) who is to receive a full email message. This may be done by receiving an email address of the full email recipient that a user types into one of the first user interface fields 20-1, 20-2 or 20-3.

In block 12-6, the client program logic 12 identifies a second email recipient (the summary email recipient) who is to receive a summary email message. This may be done by receiving an email address of the summary email recipient that a user types into the second user interface field 22.

In block 12-8, the client program logic 12 performs an action to facilitate the full email message being sent to the full email recipient and the summary email message being automatically generated from the full email message and sent to the summary email recipient. This action may include the following operations: (1) generating the full email message, which may include certain email header information that assists the server to generate and deliver the summary email message, and (2) sending the full email message to the email server 10. The header information of the full email message may include (1) a first email header field specifying the address of the full email recipient identified from one of the first user interface fields 20-1, 20-2 or 20-3, (2) a second email header field specifying the address of the summary email recipient identified from the second user interface field 22, and (3) email summary information for use by the email server 10 in generating a summary version of the email message comprising less email message text than that of the full email message.

In one aspect of the present embodiment, the email summary information could be a summary email message length that the client program logic 12 specifies in a third email header field. In a modified version of the present embodiment (described below), the email summary information could represent an abstract or comment regarding the full email message text. If a summary email message length is used, it could be some number "n" which indicates to the email server 10 that it should generate the summary email message by selecting the first "n" characters of the full email message. The summary message length could be user-specified and stored as a property or setting of the sender email client 4. The property or setting could have a label such as FYI_MESSAGE_LENGTH that could also be used to label the third email header field that contains the summary message length value. If desired, the sender email client 4 could initially maintain a default value for the summary message length, such as 140 characters. The client program logic 12 could be configured to allow the email client user to override this default at any time, such as by way an email client preferences-setting interface. The override could be permanent, or it could be temporary (such as only for the current email).

Figure 2:
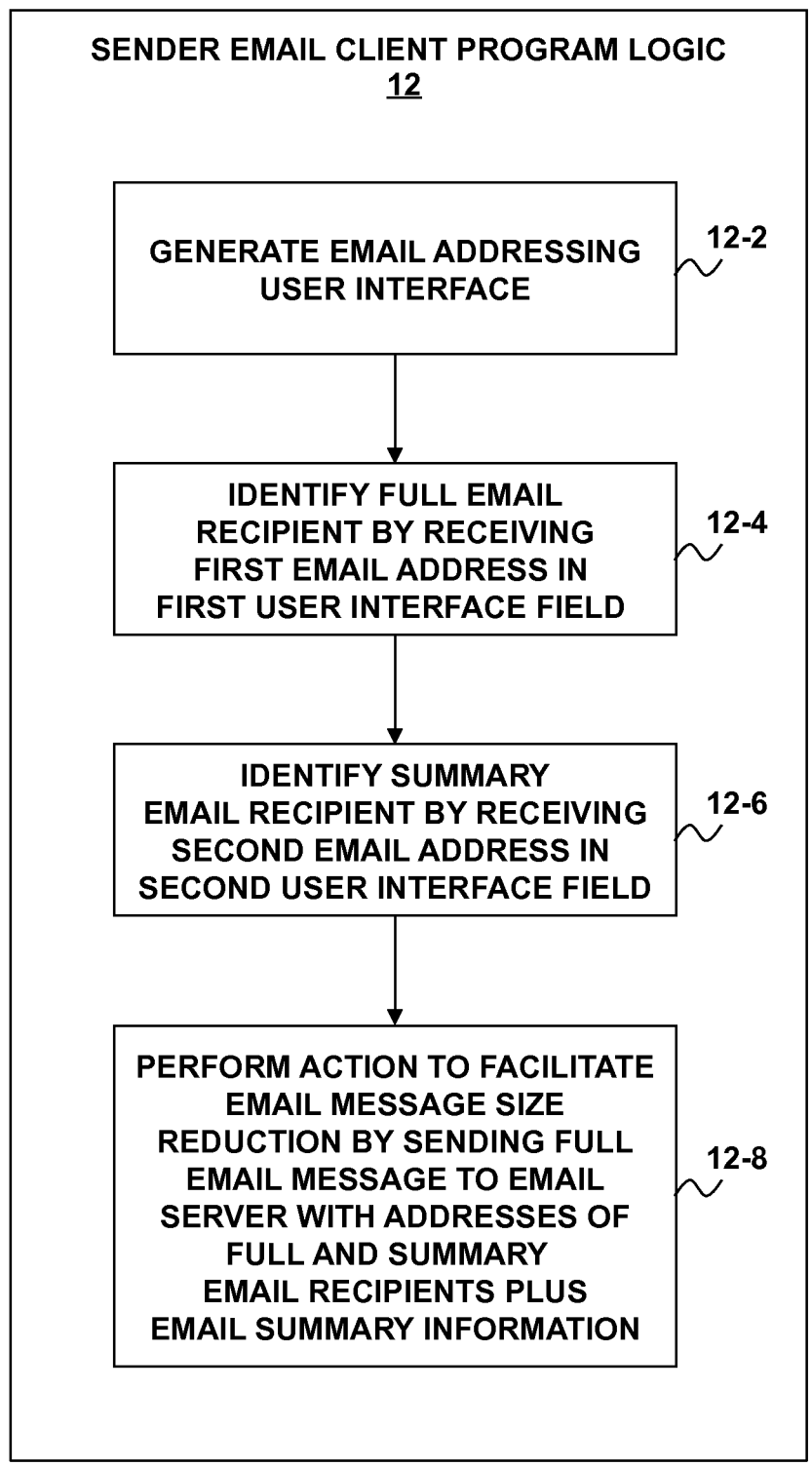
FIG. 2 is a flow diagram illustrating example email client program logic.
Figure 3:
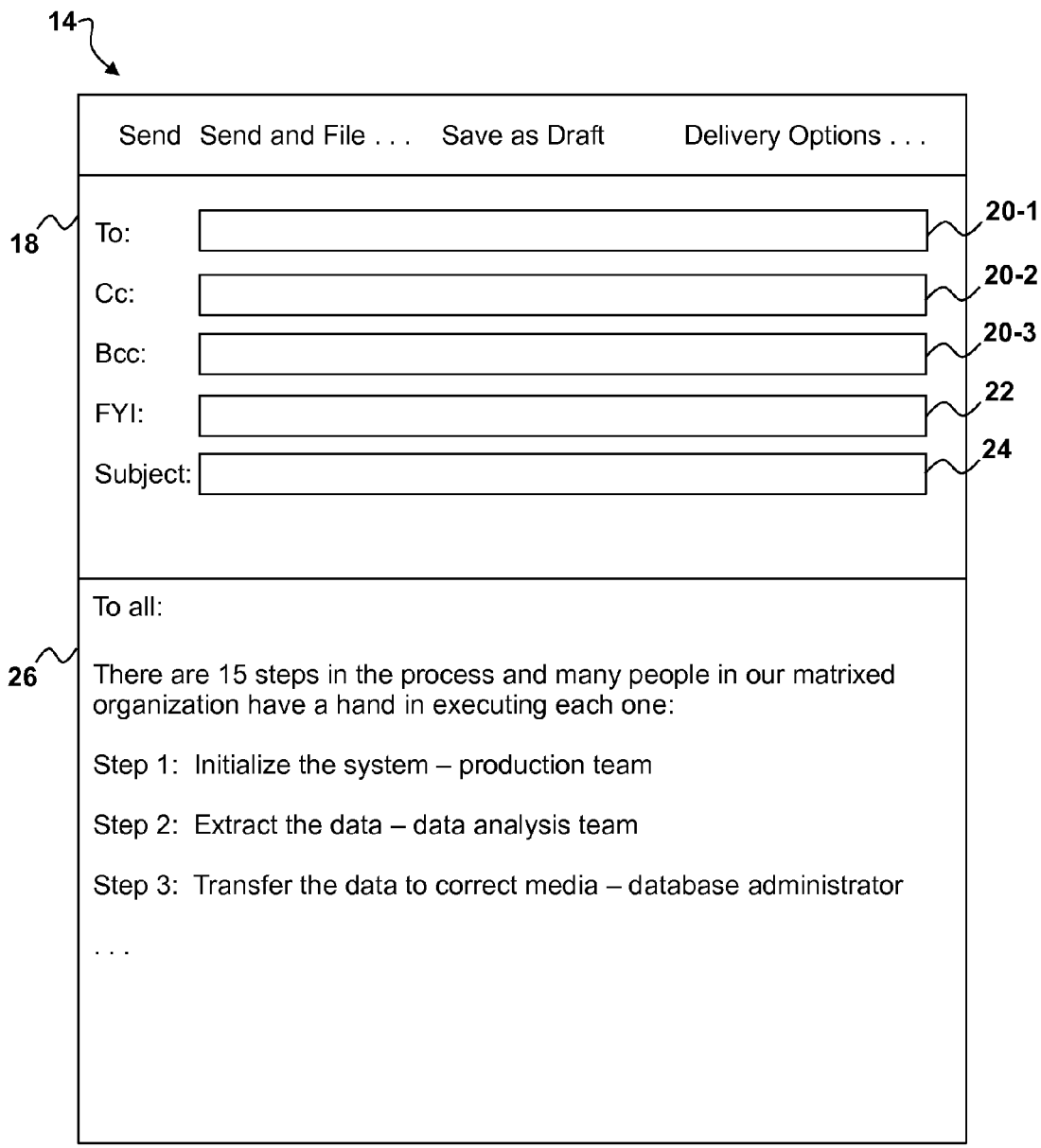
FIG. 3 is a diagrammatic illustration of an example email message composition display window.

At the conclusion of block 12-8 of FIG. 2, the full email message will have been sent to the email server 10 and will include the above-described email address and summary information needed by the server to perform its email size reduction operations. These operations will now be described.

Example Email Server Operations

Figure 4:
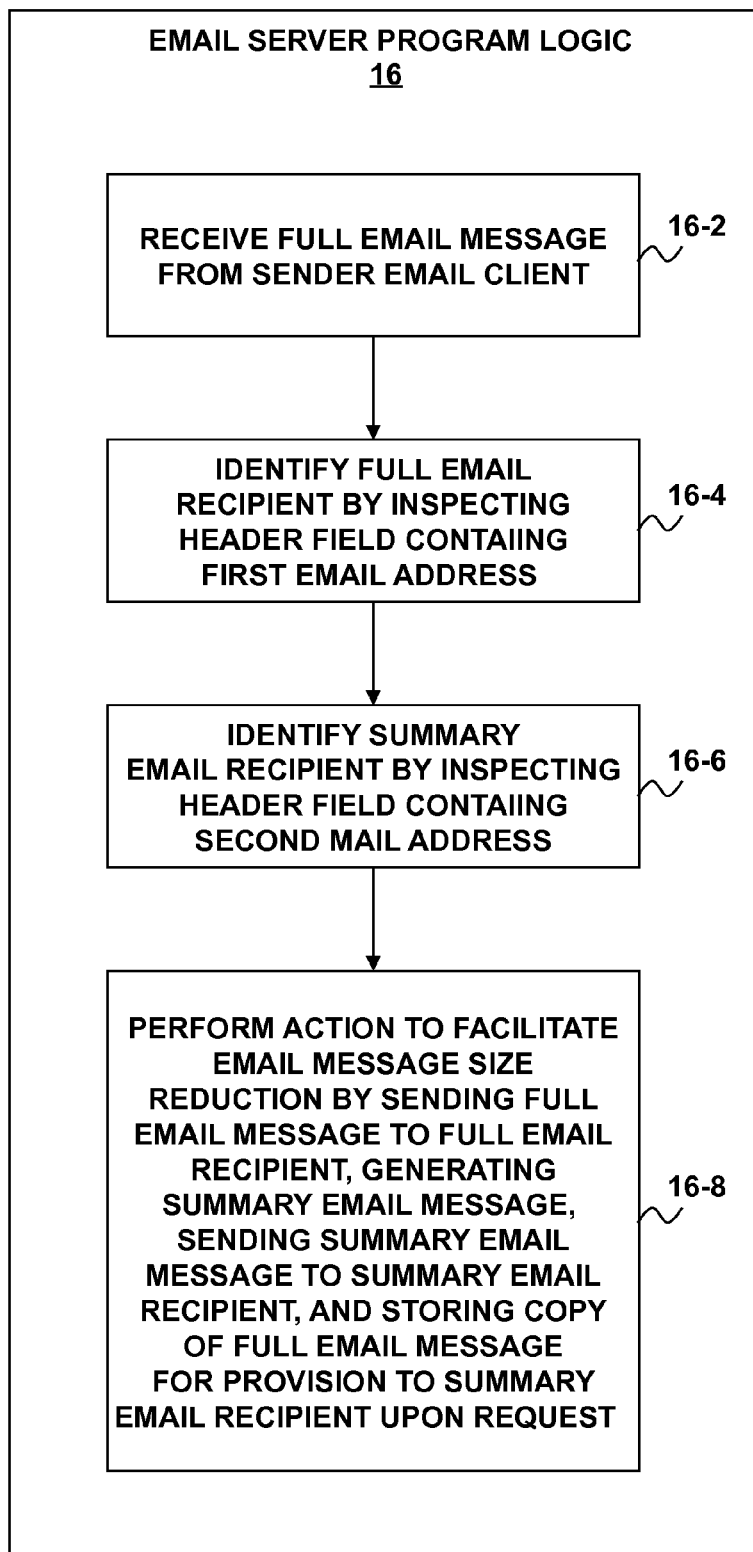
FIG. 4 is a flow diagram illustrating example email server program logic.

Beginning in block 16-2 of FIG. 4, the email server 10 receives the full email message from the sender email client 4. In block 16-4, the email server program logic 16 (hereinafter referred to as server program logic) identifies a first email recipient (the full email recipient) who is to receive the full email message. This may be done by inspecting the first email header field of the email message that contains an email address for the full email recipient.

In block 16-6, the server program logic 16 identifies a second email recipient (summary email recipient) who is to receive a summary email message. This may be done by inspecting the second email header field of the email message that contains an email address for the summary email recipient.

In block 16-8, the server program logic 16 performs an action to facilitate the full email message being sent to the full email recipient and the summary email message being automatically generated from the full email message and sent to the summary email recipient. This action may include the following operations: (1) sending the full email message for delivery to the full email recipient, (2) automatically generating the summary email message using the summary information contained in the email header of the full email message, and (3) sending the summary email message for delivery to the summary email recipient.

Operation (1) of block 16-8 represents a conventional email server operation. Operation (2) of block 16-8 can be performed by the server program logic 16 according to the summary information. If the summary information is a summary message length value, such as some character count number "n" specified in an FYI_MESSAGE_LENGTH header field, the email server 10 will use the first "n" characters of the full email message as the summary email message text.

Figure 5:
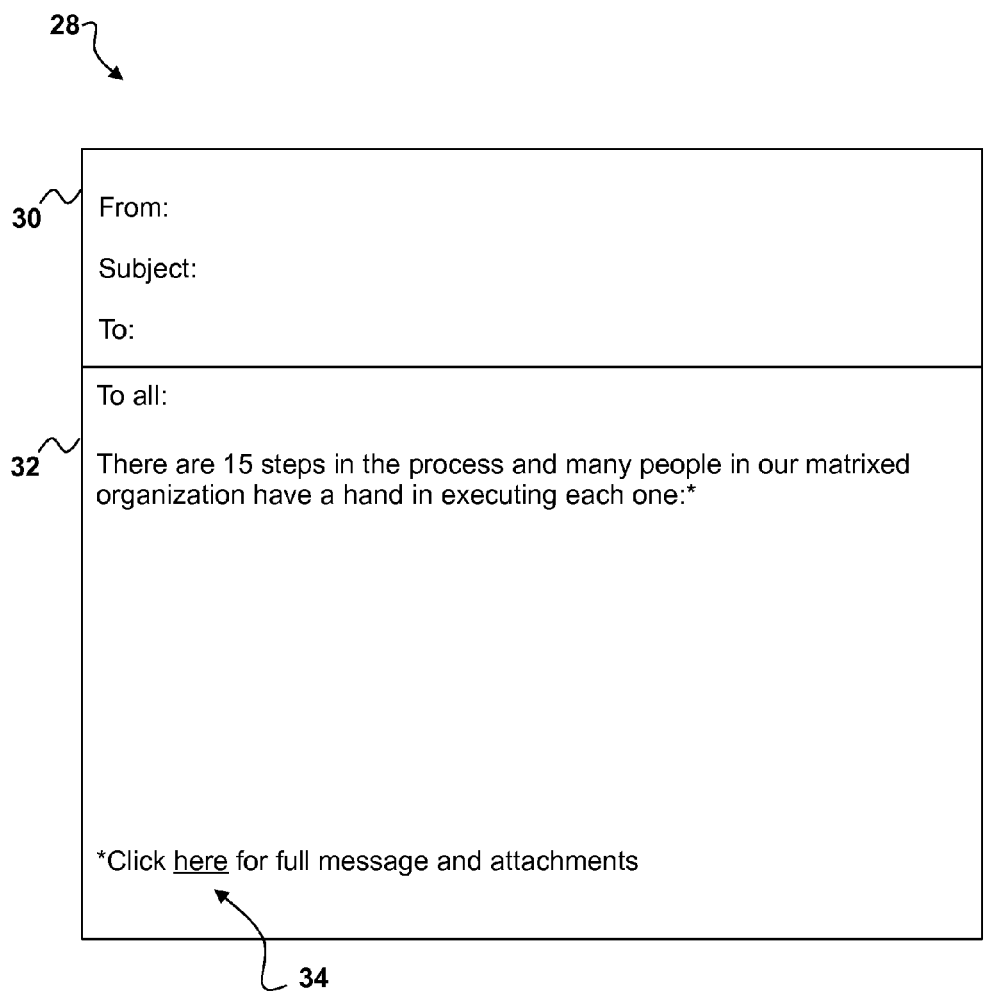
FIG. 5 is a diagrammatic illustration of an example summary email message.

This is illustrated in FIG. 5, which depicts one possible example of a summary email message 28 that may be generated by the server program logic 16 from the full email message text. In FIG. 5, the summary email message is depicted as it might be displayed by the summary email recipient client 8. The summary email message includes the usual addressing information that the summary email recipient client 8 displays in an address display window 30. By way of example, the addressing information may specify who the message is from, who it is to, and the subject thereof. The summary email recipient client 8 also generates a standard message display window 32 that contains the summary email message text. In this case, the summary message text represents the beginning portion of the full email message text shown in the email body interface 26 of FIG. 3. Generating the summary email message may also include ignoring email attachments, such that they are not included with the summary email message. Once the summary email message has been generated, operation (3) of block 16-8 may be performed as a conventional email server operation.

The action performed by the server program logic 16 in block 16-8 may further comprise a further operation (4) that includes storing a copy of the full email message in an appropriate storage location and subsequently forwarding the full message to the summary email recipient upon request. In regard to this operation, a further feature of the email size reduction technique disclosed herein is that the summary email message may contain a user interface object, such as a hyperlink, that allows the summary email recipient to automatically request the full email message (together with attachments).

As can be seen in FIG. 5, there is a hyperlink 34 below the summary message text in the message display window 32. The hyperlink 34 that represents an example implementation of the above-described user interface object that the summary email recipient may use to request the full email message and its attachments. The hyperlink may embody an HTTP address specifying where the full email message is stored by the email server 10 (e.g., an IP address or domain name plus a message identifier). When the summary email recipient clicks on the hyperlink 34, an HTTP request is sent to the email server 10 for the full email message identified by the hyperlink information. The email server 10 receives the request and sends the full message and attachments to the summary email recipient client 8. When the summary email recipient client 8 receives the full email message, it can display it in the message display window 32, replacing the summary email text. The summary email recipient client 8 may be configured so that the full email message is written over the summary email message in the client's message storage system. Thus, when the summary email message is closed and the message is thereafter reopened, the full email message text will appear rather than the summary message text.

There are several ways that a user interface object such as the hyperlink 34 may be inserted into the summary email message 28. According to one approach, the email server 10 could insert the user interface object into the summary email message 28 when it generates the message. According to another approach, the email server 10 could add an identifier to the user-defined header field section of the summary email message 28 (see RFC 5322—Internet Message Format). By way of example only, the identifier could be given a name such as FYI_MSG_ID and may contain the IP address or domain name of the email server 10 plus a message identifier for the full email message. Intelligence may be added to the summary email recipient client 8 so that when it receives the summary email message 28 it will inspect the FYI_MSG_ID identifier in the user-defined header field, and insert the hyperlink 34 into the message. This intelligence could likewise be added to the sender email client 4 and to the full email recipient client 6 so that these email clients may also be used by summary email recipients for receiving and processing summary email messages having the above-described FYI_MSG_ID header information.

Modification of First Example Embodiment

Figure 6:
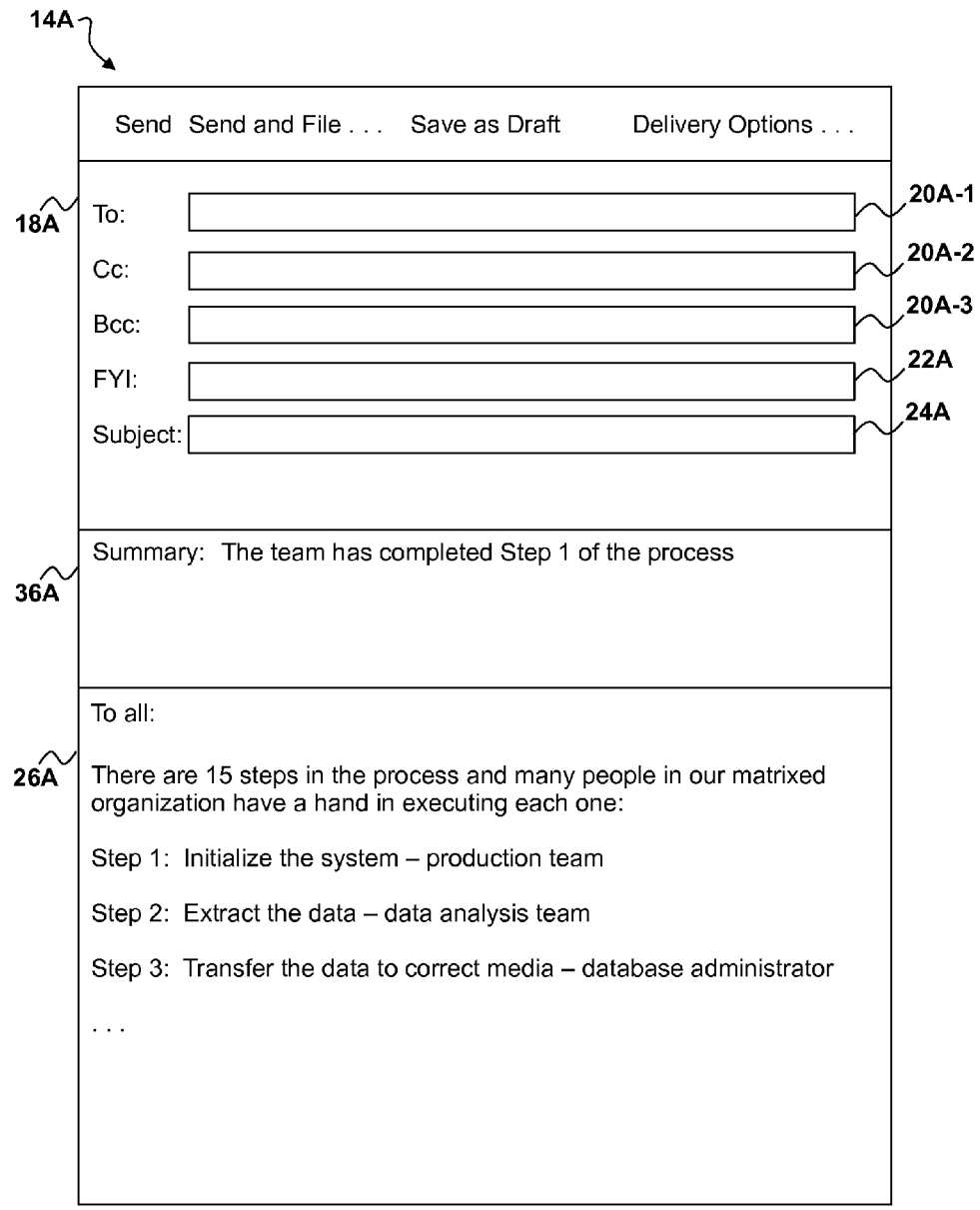
FIG. 6 is a diagrammatic illustration of another example email message composition display window.

Turning now to FIG. 6, an alternative or supplemental technique that may be used by the sender email client 4 to specify summary information to the email server 10 will now be described. FIG. 6 illustrates a modified version 14A of the email message composition display window 14 depicted in FIG. 3. The email message composition window 14A is similar in most respects to the window 14, as shown by the use of corresponding reference numbers appended with the letter "A." In addition, the email message composition window 14A includes a summary information interface 36A that provides what may be referred to as an FYI edit box. A user of the sender email client 4 may type summary email message content into this edit box, such as a comment representing an abstract of the full email message text displayed in the email body interface 26A. This summary information may be used in lieu of, or in addition to, a summary email message length value for generating the summary email message.

Figure 7:
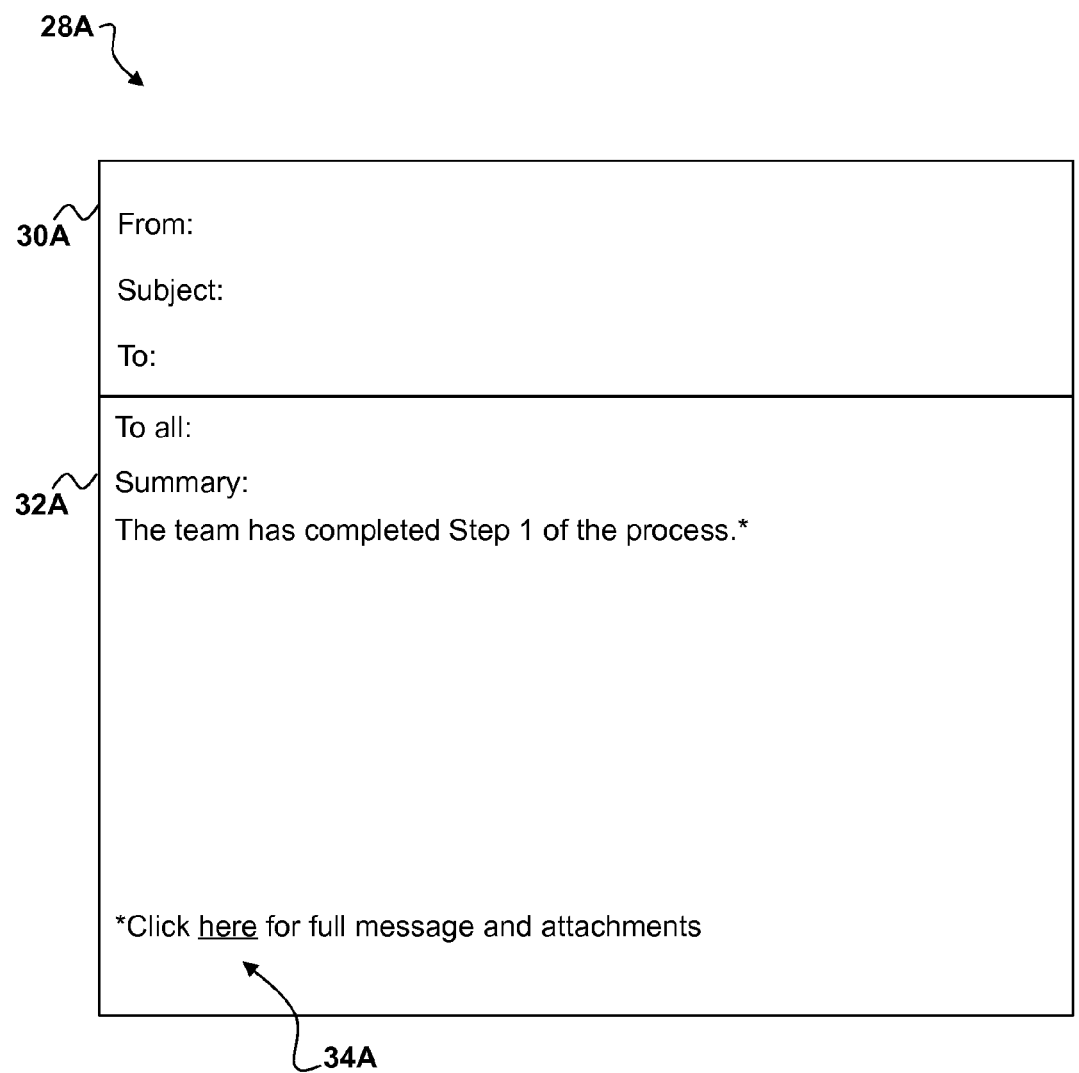
FIG. 7 is a diagrammatic illustration of another example summary email message.

FIG. 7 shows a one possible example of an alternative summary email message 28A that may be generated by the server program logic 16-8. In FIG. 7, the alternative summary email message 28A represents a modified version of the summary email message 28 depicted in FIG. 5. This is shown by the use of corresponding reference numbers appended with the letter "A." The summary email message is displayed in the message display window 32A. In this case, the summary email message 28A includes summary information in the form of a user-generated comment, namely, the same comment entered into the summary information interface 36A in the email message composition window 14A of FIG. 6.

An advantage of having user-generated summary email message content becomes apparent when considering what may happen if a summary email recipient keeps receiving summary email messages that are part of a single email message thread. In this situation, when a full email recipient receives a full email message, he or she may add additional comments to the end of the message in either a reply message or a forwarding message. Such an email message may be circulated to the same recipients as the original email message, including the summary email recipient(s) to which the original email message was addressed. However, if summary email messages are generated using only the first "n" characters of the email message text, the summary email recipients may keep receiving the same summary email message content in each successive iteration. They will not see the additional information added to the original email message during the course of the email thread if the new content is placed after the first "n" characters. Allowing users to generate a comment (representing a custom summary email message) allows the summary email recipients to be kept apprised of content added by other group members as the email thread proceeds. Moreover, the sender email client 4 could be implemented so that the custom summary information will automatically include the additional email message information by default.

Second Example Embodiment

According to a second example embodiment, the sender email client 4 may be implemented to have full responsibility for reducing email message size. In this embodiment, the sender email client 4 will perform the operations shown by the alternate client program logic 12A shown in FIG. 8. Blocks 12A-2, 12A-4 and 12A-6 of the alternate client program logic 12A are identical to blocks 12-2, 12-4 and 12-6 performed by the client program logic 12 shown in FIG. 2. Block 12A-8 is different. Instead of sending the full email message to the email server 10 so that the server can generate and deliver the summary email message, the client program logic 12 generates and sends two email messages to the email server 10. One message is the full email message destined for the full email recipient(s). The other message is the summary email message destined for the summary email recipient(s). The additional email server operations described above in connection with block 16-6 of the server logic 16, namely, inserting hyperlink information in the summary email message, storing the full email message, and providing it upon request by a summary email recipient, may also be performed by the sending email client 4. Alternatively, the email server 10 could potentially be used to perform the full email message storage and providing operations.

Example Hardware Environment for Supporting Email Client and Server Functions

Figure 9:
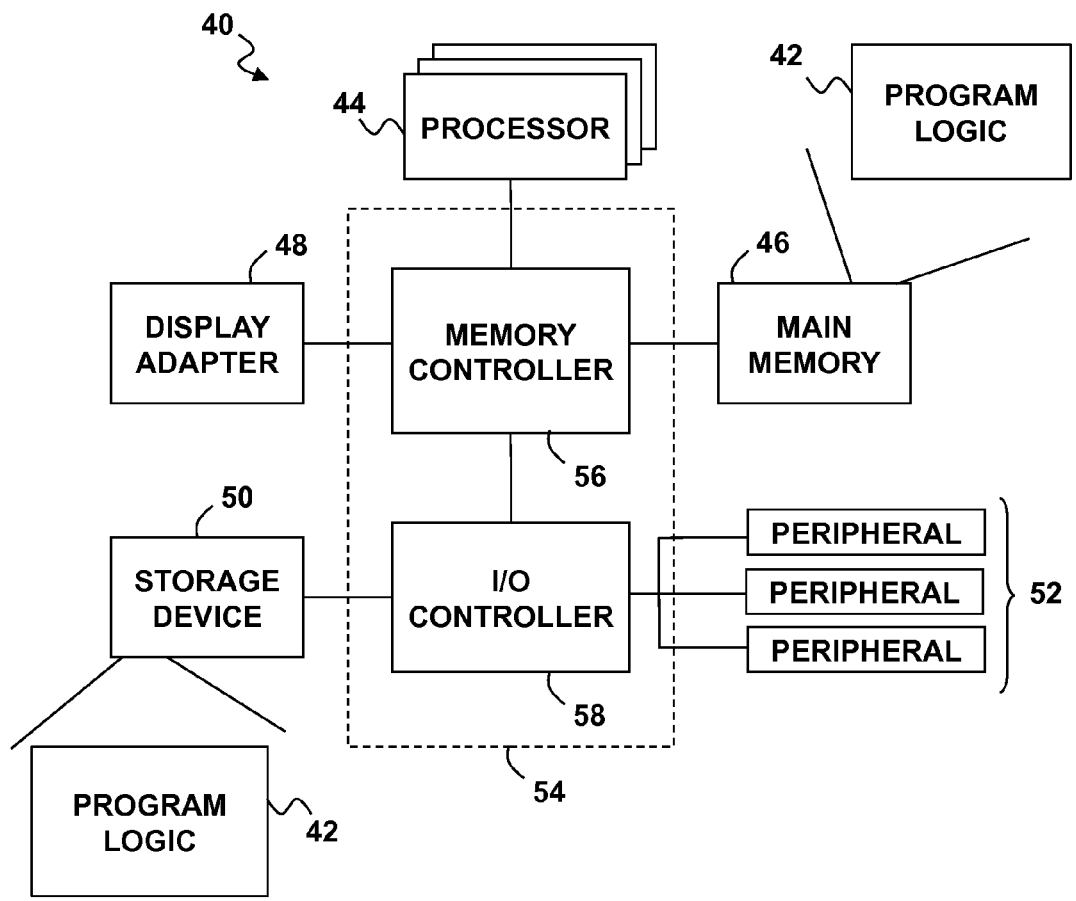
FIG. 9 is a functional block diagram showing example data processing hardware that may be used to implement the email client program logic of FIG. 2 or FIG. 8, or the email server program logic of FIG. 4.

Turning now to FIG. 9, an example computing system 40 is shown that may be used to implement the sender email client 4, the email server 10, or each of them. The system 40 supports the execution of program logic 42 that in turn controls the system 40 to perform various operations. According to one possible embodiment, the system 40 may include one or more processors 44 that operate in conjunction with a main memory 46. As used herein, the term "processors" includes, but is not necessarily limited to, single-threaded or multi-threaded CPUs (Central Processing Units) within single-core or multi-core processor devices (each core being considered a CPU) that are designed to execute program instruction logic, such as software or firmware. The processors 44 may comprise general purpose processors or they may be custom-designed to support the required functions. The memory 46 may comprise RAM (Random Access Memory), ROM (Read-Only Memory), combinations of RAM and ROM, or any other type of tangible storage medium capable of storing data in computer readable form. The processors 44 and the memory 46 may be situated within a single computing node (e.g., as part of a single-node SMP system) or they may be distributed over plural nodes (e.g., as part of a NUMA system or cluster). Other distributed topologies could also be employed. Conventional cache memories (not shown) may be respectively associated with the processors 44.

Additional components of the system 40 may include a display adapter 48 for generating visual output information (e.g., text and/or graphics) to a display device (optional for an email server system), a persistent storage device 50 (e.g., a disk drive, a flash memory, etc.), and various peripheral devices 52 that may include a keyboard or keypad input device, a pointer input device, a network interface card (NIC), a USB bus controller, a SCSI disk controller, etc. A bus or other communication infrastructure 54, which may include a memory controller hub or chip 56 (e.g., a northbridge) and an I/O (input/output) controller hub or chip 58 (e.g., a southbridge), may be used to interconnect the foregoing elements. It should be understood that the foregoing description is for purposes of illustration only, and that other components and arrangements may also be used to implement the internals of the system 40.

Figure 8:
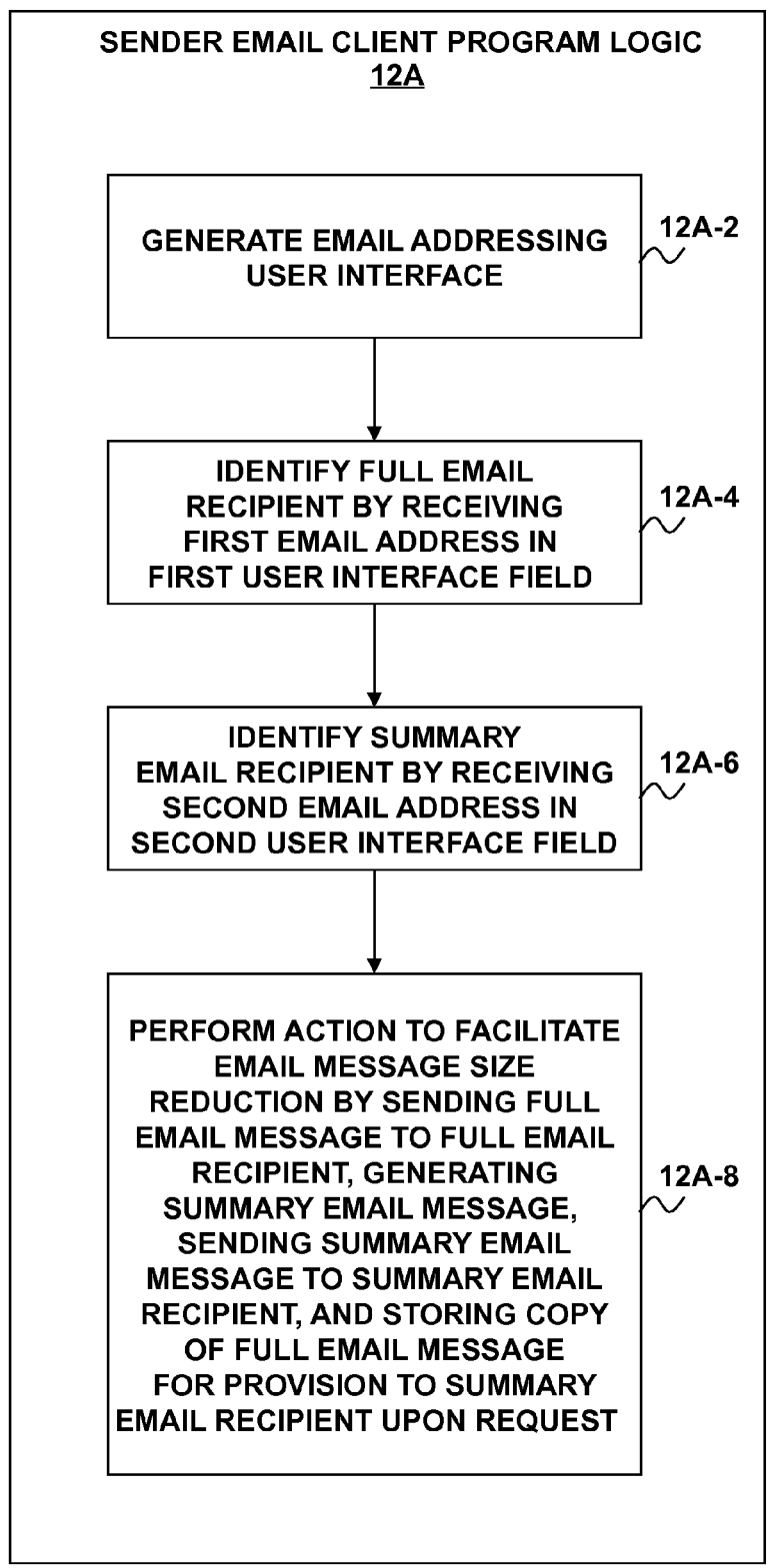
FIG. 8 is a flow diagram illustrating alternative example email client program logic.

If the system 40 is used to implement the sender email client 4, the program logic 42 will represent the client program logic 12 of FIG. 2 (or the alternate client program logic 12A of FIG. 8). If the system 40 is used to implement the email server 10, the program logic will represent the server program logic 16 of FIG. 4. In either case, the program logic 42 may be variously implemented in software, firmware, hardware or any combination thereof. If implemented in software, the program logic 42 may be loaded from the persistent storage 50 into a portion of the main memory 46 that comprises RAM. If implemented in firmware, the program logic 42 could reside in a portion of the main memory 46 that comprises ROM, such as EPROM memory. In software and firmware embodiments of the program logic 42, the logic may comprise a collection of program instructions, possibly having entry and exit points, written in a suitable programming language. Such programming languages include, but are not limited to, a high level procedural language such as C, a high level object oriented language such as C++, or a lower level language such as assembly. The program instructions written in such languages may be compiled or assembled (as the case may be) into machine language instructions that are capable of execution on the processors 44. When the machine language program instructions are loaded into and executed by the processors 44, the resultant programmed system 40 becomes a particular machine for practicing embodiments of the email size reduction operations described herein.

The program instructions in a software or firmware embodiment of the program logic 42 may be embodied in one or more modules, each of which may be compiled and linked into an executable program, installed in a dynamically linked library, or otherwise made ready for invocation and execution by the system 40. The module(s) may be implemented to run with or without the support of an underlying operating system. The module(s) may also be written in an interpreted programming language such as BASIC, Perl, Python or Java® and executed directly by an interpreter or compiled into byte code for execution by a virtual machine. It will be appreciated that the modules may be callable from other modules or from themselves, and/or may be invoked in response to detected events or interrupts. Moreover, although in some embodiments a module may be separately compiled, in other embodiments a module may represent a subset of instructions of a separately compiled program, and may not have an interface available to other logical program units.

As mentioned, some embodiments of the program logic 42 could be implemented using dedicated logic hardware. Examples of such hardware would include connected logic units such as gates and flip-flops, and/or integrated devices, such as application specific integrated circuits (ASICs) and programmable gate arrays (e.g., field programmable gate arrays (FPGAs)) or processors. In some embodiments, such hardware units might be used in lieu of the processors 44, memory 46 and other components of the system 40, i.e., in a particular machine comprising dedicated logic circuits.

Accordingly, a technique for reducing email message size has been disclosed. It will be appreciated that the foregoing concepts may be variously embodied in any of a machine-implemented method, a computing system, and a computer program product in which programming logic is provided by one or more computer-readable storage media for use in controlling a computing system to perform the required functions. Example embodiments of a machine-implemented method were previously described in connection with FIGS. 2-8. Example embodiments of a computing system were previously described in connection with FIG. 9. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 10:
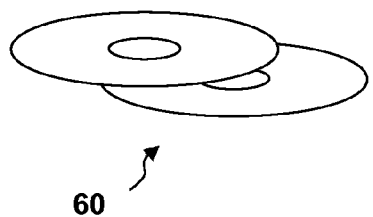
FIG. 10 is a diagrammatic illustration showing example computer-readable storage media that may be used to provide a computer program product for supporting email message size reduction.

Example computer-readable storage media for storing such program instructions are shown by reference numerals 46 (memory) and 50 (storage device) of the system 40 of FIG. 9. A further example of computer-readable storage media that may be used to store the program instructions is shown by reference numeral 60 in FIG. 10. The media 60 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The media could also be provided by portable magnetic storage media (such as floppy disks, flash memory sticks, etc.), or magnetic storage media combined with drive systems (e.g. disk drives), or storage media incorporated in a computing system, such as random access memory (RAM), read-only memory (ROM) or other semiconductor or solid state memory. More broadly, the media could comprise any electronic, magnetic, optical, magneto-optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of media, when the program instructions are loaded into and executed by a computing system, the resultant programmed system becomes a particular machine for practicing embodiments of the method(s) and system(s) described herein.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A system, comprising:
one or more processors;
a memory operatively coupled to said one or more processors;
program instructions stored in said memory, said program instructions being executable by said one or more processors to perform operations for supporting email message size reduction, said operations comprising:
identifying a first email recipient that is to receive a full version of an email message comprising full email message text;
identifying a second email recipient that is to receive a summary version of said email message comprising summary message text in lieu of said full email message text, said identifying a second email recipient comprising:
(1) if said identifying a second email recipient is performed by an email client, receiving an email address of said second email recipient in a second user interface field; or
(2) if said identifying a second email recipient is performed by an email server, inspecting a second email header field that contains an email address of said second email recipient, said second email header field being different from a first email header field that contains an email address of said first email recipient; and
taking an action to facilitate said full version of said email message being sent to said first email recipient and said summary version of said email message being automatically generated from said full version of said email message and sent to said second email recipient.

2. The system of claim 1, wherein said summary version of said email message comprises (1) a shortened version of said email message, or (2) a comment regarding said email message, or (3) both.

3. The system of claim 1, wherein said summary version of said email message contains information that allows said second email recipient to automatically request said full version of said email message.

4. The system of claim 3, wherein said information comprises a hyperlink in said summary version of said email message containing an address from which said full version of said email message may be retrieved.

5. The system of claim 3, wherein said information comprises a header field in said summary version of said email message that is useable by an email client of said second email recipient to insert a hyperlink in said summary version of said email message from which said full version of said email message may be retrieved.

6. The system of claim 1, wherein said operations are performed by an email client, and wherein:
- said identifying a first email recipient comprises receiving an email address of said first email recipient in a first user interface field;
- said identifying a second email recipient comprises receiving an email address of said second email recipient in a second user interface field;
- said facilitating action comprises sending said full version of said email message to an email server;
- said full version of said email message including a first email header field that contains said email address of said first email recipient;
- said full version of said email message further including a second email header field that contains said email address of said second email recipient; and
- said full version of said email message further including information for use by said email server to generate said summary version of said email message.

7. The system of claim 1, wherein said operations are performed by an email server that receives said full version of said email message from an email client, and wherein:
- said identifying a first email recipient comprises inspecting a first email header field that contains an email address of said first email recipient;
- said identifying a second email recipient comprises inspecting a second email header field that contains an email address of said second email recipient;
- said facilitating action comprises sending said full version of said email message for delivery to said first email recipient;
- said facilitating action further comprises automatically generating said summary version of said email message using information contained in said full version of said email message and sending said summary version of said email message for delivery to said second email recipient; and
- said facilitating action further comprises storing a copy of said full version of said email message and forwarding said full version of said email message to second email recipient upon request.

8. A computer program product, comprising:
- one or more non-transitory computer-readable storage media;
- program instructions stored on said one or more media, said program instructions being executable by one or more processors to perform operations for supporting email message size reduction, said operations comprising:
- identifying a first email recipient that is to receive a full version of an email message comprising full email message text;
- identifying a second email recipient that is to receive a summary version of said email message comprising summary message text in lieu of said full email message text, said identifying a second email recipient comprising:
  - (1) if said identifying a second email recipient is performed by an email client, receiving an email address of said second email recipient in a second user interface field; or
  - (2) if said identifying a second email recipient is performed by an email server, inspecting a second email header field that contains an email address of said second email recipient, said second email header field being different from a first email header field that contains an email address of said first email recipient; and
- taking an action to facilitate said full version of said email message being sent to said first email recipient and said summary version of said email message being automatically generated from said full version of said email message and sent to said second email recipient.

9. The computer program product of claim 8, wherein said summary version of said email message comprises (1) a shortened version of said email message, or (2) a comment regarding said email message, or (3) both.

10. The computer program product of claim 8, wherein said summary version of said email message contains information that allows said second email recipient to automatically request said full version of said email message.

11. The computer program product of claim 10, wherein said information comprises a hyperlink in said summary version of said email message containing an address from which said full version of said email message may be retrieved.

12. The computer program product of claim 10, wherein said information comprises a header field in said summary version of said email message that is useable by an email client of said second email recipient to insert a hyperlink in said summary version of said email message from which said full version of said email message may be retrieved.

13. The computer program product of claim 8, wherein said operations are performed by an email client, and wherein:
- said identifying a first email recipient comprises receiving an email address of said first email recipient in a first user interface field;
- said identifying a second email recipient comprises receiving an email address of said second email recipient in a second user interface field;
- said facilitating action comprises sending said full version of said email message to an email server;
- said full version of said email message including a first email header field that contains said email address of said first email recipient;
- said full version of said email message further including a second email header field that contains said email address of said second email recipient; and
- said full version of said email message further including information for use by said email server to generate said summary version of said email message.

14. The computer program product of claim 8, wherein said operations are performed by an email server that receives said full version of said email message from an email client, and wherein:
- said identifying a first email recipient comprises inspecting a first email header field that contains an email address of said first email recipient;
- said identifying a second email recipient comprises inspecting a second email header field that contains an email address of said second email recipient;
- said facilitating action comprises sending said full version of said email message for delivery to said first email recipient;
- said facilitating action further comprises automatically generating said summary version of said email message using information contained in said full version of said email message and sending said summary version of said email message for delivery to said second email recipient; and said facilitating action further comprises storing a copy of said full version of said email message and forwarding said full version of said email message to second email recipient upon request.

15. An email client computer program product, comprising:
  one or more non-transitory computer-readable storage media;
  program instructions stored on said one or more media, said program instructions being executable by one or more processors to perform email client operations for supporting email message size reduction, said operations comprising:
  providing a user interface for specifying an email recipient that is to receive a summary version of an email message, said summary version of said email message comprising less text than a full version of said email message;
  forwarding said full version of said email message and an email address for said email recipient to an email server for processing of said email message into said summary version of said email message; and
  said full version of said email message containing information for use by said email server in preparing said summary version of said email message.

16. The email client computer program product of claim 15, wherein said summary version of said email message comprises (1) a shortened version of said email message, or (2) a comment regarding said email message, or (3) both.

17. An email server computer program product, comprising:
  one or more non-transitory computer-readable storage media;
  program instructions stored on said one or more media, said program instructions being executable by one or more processors to perform email server operations for supporting email message size reduction, said operations comprising:
  when processing an email message, determining whether there is an email recipient that is to receive a summary version of said email message;
  said determining being performed by inspecting a second email header field in said email message that contains an email address of said email recipient that is to receive a summary version of said email message, said second email header field being different from a first email header field in said email message that contains an email address of an email recipient that is to receive a full version of said email message;
  if there is such an email recipient, preparing said summary version of said email message comprising less message text than said email message; and
  sending said summary version of said email message for delivery to said email recipient.

18. The email server computer program product of claim 17, wherein:
  said summary version of said email message comprises (1) a shortened version of said email message, or (2) a comment regarding said email message, or (3) both;
  said summary version of said email message contains information that allows said second email recipient to automatically request said email message;
  said information comprising (1) a hyperlink in said summary version of said email message containing an address from which said email message may be retrieved, or (2) a header field in said summary version of said email message that is useable by an email client of said second email recipient to insert a hyperlink in said summary version of said email message from which said email message may be retrieved.

* * * * *